United States Patent
Li et al.

(10) Patent No.: US 11,418,243 B2
(45) Date of Patent: Aug. 16, 2022

(54) CONTROL TRANSMISSION METHOD AND APPARATUS

(71) Applicant: ZTE Corporation, Guangdong (CN)

(72) Inventors: Xincai Li, Guangdong (CN); Yajun Zhao, Guangdong (CN); Hanging Xu, Guangdong (CN); Ling Yang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 130 days.

(21) Appl. No.: 16/876,085

(22) Filed: May 17, 2020

(65) Prior Publication Data

US 2020/0280358 A1 Sep. 3, 2020

Related U.S. Application Data

(63) Continuation of application No. PCT/CN2017/111731, filed on Nov. 17, 2017.

(51) Int. Cl.
*H04B 7/06* (2006.01)
*H04L 1/18* (2006.01)
(Continued)

(52) U.S. Cl.
CPC ......... *H04B 7/0626* (2013.01); *H04L 1/1819* (2013.01); *H04L 5/0051* (2013.01);
(Continued)

(58) Field of Classification Search
CPC ... H04L 5/0055; H04L 5/0051; H04L 5/0094; H04L 1/1819; H04L 5/10; H04W 72/042;
(Continued)

(56) References Cited

U.S. PATENT DOCUMENTS

2014/0301231 A1 10/2014 Hooli et al.
2016/0050054 A1 2/2016 Wager et al.
(Continued)

FOREIGN PATENT DOCUMENTS

CN 102316526 A 1/2012
CN 102595596 A 7/2012
(Continued)

OTHER PUBLICATIONS

International Search Report and Written Opinion dated Aug. 8, 2018 for International Application No. PCT/CN2017/111731, filed on Nov. 17, 2017 (7 pages).

(Continued)

*Primary Examiner* — Rownak Islam
(74) *Attorney, Agent, or Firm* — Perkins Coie LLP (57) ABSTRACT

Methods, systems, and devices related to transmissions of control information to enhance channel coverage are disclosed. In one exemplary aspect, a method for wireless communication includes receiving, from a base station, a control message for scheduling a transmission of control information on a physical channel based on a transmission mode of the physical channel, the control information comprising at least channel state information; and transmitting, based on the control message, one or more redundant versions of the control information on the physical channel using a plurality of adjacent slots or mini-slots in time domain.

20 Claims, 6 Drawing Sheets

(51) Int. Cl.
*H04L 5/00* (2006.01)
*H04L 5/10* (2006.01)
*H04W 72/04* (2009.01)
*H04W 80/02* (2009.01)

(52) U.S. Cl.
CPC .......... *H04L 5/0055* (2013.01); *H04L 5/0094* (2013.01); *H04L 5/10* (2013.01); *H04W 72/042* (2013.01); *H04W 72/0446* (2013.01); *H04W 80/02* (2013.01)

(58) Field of Classification Search
CPC .............. H04W 72/0446; H04W 80/02; H04B 7/0626; H04B 7/0621
USPC ........................................................ 370/329
See application file for complete search history.

(56) References Cited

U.S. PATENT DOCUMENTS

| | | | |
|---|---|---|---|
| 2017/0331670 A1* | 11/2017 | Parkvall | H04J 11/0079 |
| 2018/0176902 A1* | 6/2018 | Huang | H04W 72/0413 |
| 2018/0234155 A1* | 8/2018 | Neuhaus | H04L 1/0026 |
| 2018/0310298 A1* | 10/2018 | Li | H04L 5/0053 |
| 2020/0045675 A1* | 2/2020 | Harrison | H04L 5/0096 |

FOREIGN PATENT DOCUMENTS

| | | |
|---|---|---|
| CN | 106160823 A | 11/2016 |
| KR | 10-2017-0097079 A | 8/2017 |
| RU | 2524867 C2 | 12/2010 |
| WO | 2003/105392 A1 | 12/2003 |
| WO | 2012/094990 A1 | 7/2012 |
| WO | 2012/155753 A1 | 11/2012 |
| WO | 2016/105099 A1 | 6/2016 |
| WO | 2016/155571 A1 | 10/2016 |
| WO | 2018/059318 A1 | 4/2018 |

OTHER PUBLICATIONS

Decision on Grant for Russian Patent Application No. 2020119822, dated Oct. 27, 2020.
Extended European Search Report for European Patent Application No. 17932001.5, dated Oct. 14, 2020.
Qualcomm Inc., "HARQ-ACK and CQI repetition in Multiflow HSPA," 3GPP TSG RAN WG1 Meeting #70, Qingdao, China, R1-123800, 5 pages, Aug. 2012.
Communication pursuant to Article 94(3) EPC for European Patent Application No. 17932001.5, dated Dec. 7, 2021 (6 pages).
Office Action for Korean Patent Application No. 10-2017-0097079, dated Sep. 28, 2021, with English summary. (6 pages).

* cited by examiner

| Transmission mode | DCI format | Search Space | Transmission scheme of PUSCH corresponding to PDCCH |
|---|---|---|---|
| Mode 1 | DCI format 0 | Common and UE specific by C-RNTI | Single-antenna port, port 10 (see Subclause 8.0.1) |
| | DCI format 0A or 0B or 0C | UE specific by C-RNTI | Single-antenna port, port 10 (see Subclause 8.0.1) |
| Mode 2 | DCI format 0 | Common and UE specific by C-RNTI | Single-antenna port, port 10 (see Subclause 8.0.1) |
| | DCI format 0A or 0B or 0C | UE specific by C-RNTI | Single-antenna port, port 10 (see Subclause 8.0.1) |
| | DCI format 4 or 4A or 4B | UE specific by C-RNTI | Closed-loop spatial multiplexing (see Subclause 8.0.2) |

CONTROL TRANSMISSION METHOD AND APPARATUS

CROSS REFERENCE TO RELATED APPLICATIONS

This patent document is a continuation of and claims benefit of priority to International Patent Application No. PCT/CN2017/111731, filed on Nov. 17, 2017. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY OF PARTICULAR EMBODIMENTS

This document discloses methods, systems, and devices related to digital wireless communication, and more specifically, to techniques related to transmissions of control information to enhance channel coverage.

In one exemplary aspect, a method for wireless communication is disclosed. The method includes transmitting, to a user equipment, a control message based on a transmission mode of a physical channel. The control message is configured to schedule a transmission of control information on the physical channel, the control information comprising at least channel station information. The transmission of control information comprises transmitting one or more redundant versions of the control information using a plurality of adjacent slots or mini-slots in time domain.

In some embodiments, the method includes determining a transmission mode of a physical channel; and transmitting, to a user equipment, a control message based on the transmission mode to schedule a transmission of control information, including channel state information, on the physical channel such that one or more redundant versions of the control information is transmitted using a plurality of adjacent slots or mini-slots in time domain.

In some embodiments, the control message is scrambled by a radio network temporary identifier (RNTI). In some embodiments, a first redundant version of the control information is transmitted using a first subset of the plurality of adjacent slots or mini-slots and a second redundant version of the control information is transmitted using a second subset of the plurality of adjacent slots or mini-slots.

In some embodiments, the control information is transmitted in a form of a transport block. In some implementations, a first code block group of the transport block is transmitted using a first subset of the plurality of adjacent slots or mini-slots and a second code block group of the transport block is transmitted using a second subset of the plurality of adjacent slots or mini-slots. In some embodiments, a size of the transport block has an inverse correspondence to a subcarrier spacing of the physical channel.

In some embodiments, the control information is transmitted in a form of one or more code block groups of a transport block. In some implementations, the control message includes a field to indicate the one or more code block groups to be transmitted on the physical channel. In some embodiments, the one or more code block groups share a same hybrid automatic repeat request (HARQ) process. Alternatively, each of the one or more code block groups may use a different hybrid automatic repeat request (HARQ) process.

In some embodiments, the control message includes a field to indicate whether the control information further includes radio link control (RLC) feedback. In some implementations, the control information includes one or more redundant versions of hybrid automatic repeat request acknowledgment (HARQ-ACK) information mapped to adjacent symbols of a demodulation reference signal (DMRS) carried on the physical channel.

In another exemplary aspect, a method for wireless communication is disclosed. The method includes receiving, from a base station, a control message for scheduling a transmission of control information on a physical channel based on a transmission mode of the physical channel, the control information comprising at least channel state information; and transmitting, based on the control message, one or more redundant versions of the control information on the physical channel using a plurality of adjacent slots or mini-slots in time domain. In some embodiments, the control message is scrambled by a radio network temporary identifier (RNTI).

In some embodiments, the transmitting step in the above method further includes transmitting a first redundant version of the control information using a first subset of the plurality of adjacent slots or mini-slots, and transmitting a second redundant version of the control information using a second subset of the plurality of adjacent slots or mini-slots.

In some embodiments, the control information is transmitted in a form of a transport block. The transmitting may comprise transmitting a first code block group of the transport block using a first subset of the plurality of adjacent slots or mini-slots, and transmitting a second code block group of the transport block using a second subset of the plurality of adjacent slots or mini-slots. In some implementations, a size of the transport block has an inverse correspondence to a subcarrier spacing of the physical channel.

In some embodiments, the control information is transmitted in a form of one or more code block groups of a transport block. In some implementations, the control message includes a field to indicate the one or more code block groups to be transmitted on the physical channel. In some embodiments, the one or more code block groups share a same hybrid automatic repeat request (HARQ) process. Alternatively, each of the one or more code block groups may use a different hybrid automatic repeat request (HARQ) process.

In some embodiments, the control message includes a field to indicate whether the control information further includes radio link control (RLC) feedback. In some implementations, the control information includes one or more redundant versions of hybrid automatic repeat request acknowledgment (HARQ-ACK) information mapped to adjacent symbols of a demodulation reference signal (DMRS) carried on the physical channel.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

The development of the new generation of wireless communication—5G New Radio (NR) communication—is a part of a continuous mobile broadband evolution process to meet the requirements of increasing network demand. 5G NR aims to make wireless broadband to have fiber-like performance at a significantly lower cost-per-bit. With new levels of latency, reliability, and security, 5G NR will scale to efficiently connect the massive Internet of Things (IoT) architecture, and will offer new types of mission-critical services.

5G communication techniques will likely use high-frequency data transmission. The presence of high-frequency wireless channel path loss, however, can cause poor coverage. Therefore, there is a need to consider ways to enhance coverage for transmission, particularly for uplink (UL) transmissions coverage from a user equipment (UE). It is noted that uplink transmissions are not limited to transmissions from a UE to a base station. Transmissions from a UE to a control unit (e.g., a UE acting as a femto cell) can also be referred to as uplink transmission.

The NR uplink coverage issue needs to be addressed for at least the following deployment scenarios:

Scenario #1: Long-Term Evolution (LTE) systems are deployed at a low frequency, with NR systems deployed at a high frequency (e.g., 3.5 GHz). In this scenario, both the physical uplink shared channel (PUSCH) and physical uplink control channel (PUCCH) of the LTE systems operate at a low frequency. The corresponding NR PUCCH and PUSCH operate at a configurable high frequency (e.g., 3.5 GHz).

Scenario #2: LTE systems are deployed at a low frequency, with NR systems deployed at a high frequency (e.g., 3.5 GHz). Additionally, NR supplemental uplink (SUL) with UL sharing are deployed at a low frequency. In this scenario, the NR and LTE systems are collocated, and the LTE band uses LTE/NR UL sharing.

Scenario #3: LTE systems are deployed at a first low frequency (e.g., LF1), with NR systems deployed at multiple bands (e.g., LF2 and 3.5 GHz). In this scenario, NR and LTE are collocated.

In some of the scenarios discussed above, when UL has coverage issues, UL data traffic relies only on LTE-PUSCH at a low frequency, while NR-PUCCH is maintained at a high frequency (e.g., 3.5 GHz). It is, therefore, desirable to report at least some of the uplink control information with coverage enhancing techniques to obtain equivalent coverage as compared to PUCCH.

Currently, the uplink control information includes at least the channel state information (CSI), also referred to as CSI feedback, and hybrid automatic repeat request acknowledgement (HARQ-ACK) information. The CSI is typically carried on the PUCCH. When CSI is multiplexed with the PUSCH, it is reported independently and processed separately according to control information processing procedures. In order to enhance uplink coverage issues when all data traffic relies on LTE-PUSCH and NR-PUCCH operates at a high frequency, it is desirable to report relevant CSI on a PUSCH channel with a low bit rate.

At the same time, while NR systems support data transmissions based on code block groups (CBGs), all the CBGs in a transport block (TB) are currently scheduled at the same time (e.g., sharing the same HARQ process number). Because the CBGs are not scheduled independently, the HARQ process can only be released after all CBGs of a TB are received correctly, thereby causing limitations of resource scheduling. It is, therefore, also desirable to introduce techniques that allow independent scheduling of the CBGs of a particular TB.

This patent document describes coverage enhancing techniques for uplink control transmission that comprise the following aspects:

1. The transport block size of CSI can be small. This can be achieved by assigning a small number of time-frequency resources to CSI. In some embodiments, a downlink control message such as a DCI message may include a CSI request field that indicates for which carrier, carrier group, or carrier set CSI is requested. Also, a simple modulation and coding scheme (MCS), such as QPSK, can be used for transmissions of such uplink control information.

2. Transmission of uplink control information on PUSCH can be scheduled by a downlink control message (e.g., DCI) transmitted on the physical downlink control channel (PDCCH).

3. Redundancy in uplink control information can help increase the success rate of demodulating such information and enhance coverage of the uplink channel. For example, multiple redundant versions of a TB or a CBG of the CSI can be transmitted over a set of bundled (e.g., adjacent) slots or mini-slots. Different slots or mini-slots can transmit different redundant versions of the TB or the CBG.

4. The HARQ-ACK information can be piggybacked on PUSCH. Similarly, redundancy of HARQ-ACK information can help increase the success rate of demodulating the relevant information, thereby enhancing coverage of the uplink channel.

Details of the techniques are further described in the following embodiments.

Example Embodiment 1

Figure 1:
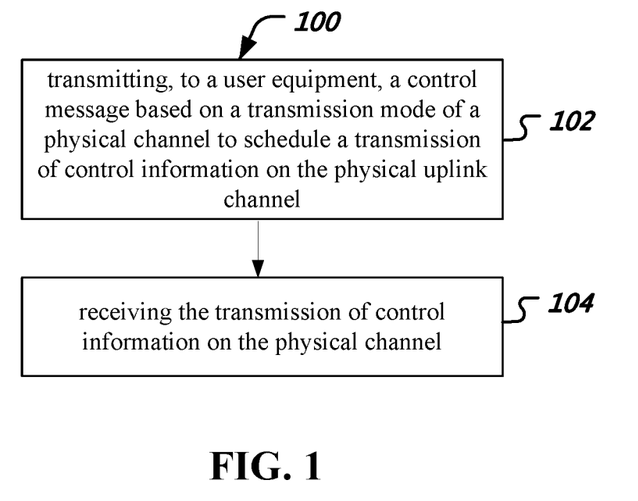
FIG. 1 shows a flowchart representation of a method for wireless communication that can be implemented at a base station.

This embodiment describes exemplary operations that can be performed by a base station. FIG. 1 shows a flowchart representation of a method 100 for wireless communication that can be implemented at a base station. The method 100 includes, at 102, transmitting, to a user equipment (UE), a control message based on a transmission mode of a physical channel to schedule a transmission of control information on the physical channel. The method 100 also includes, at 104, receiving the transmission of control information on the physical channel.

Figure 2:
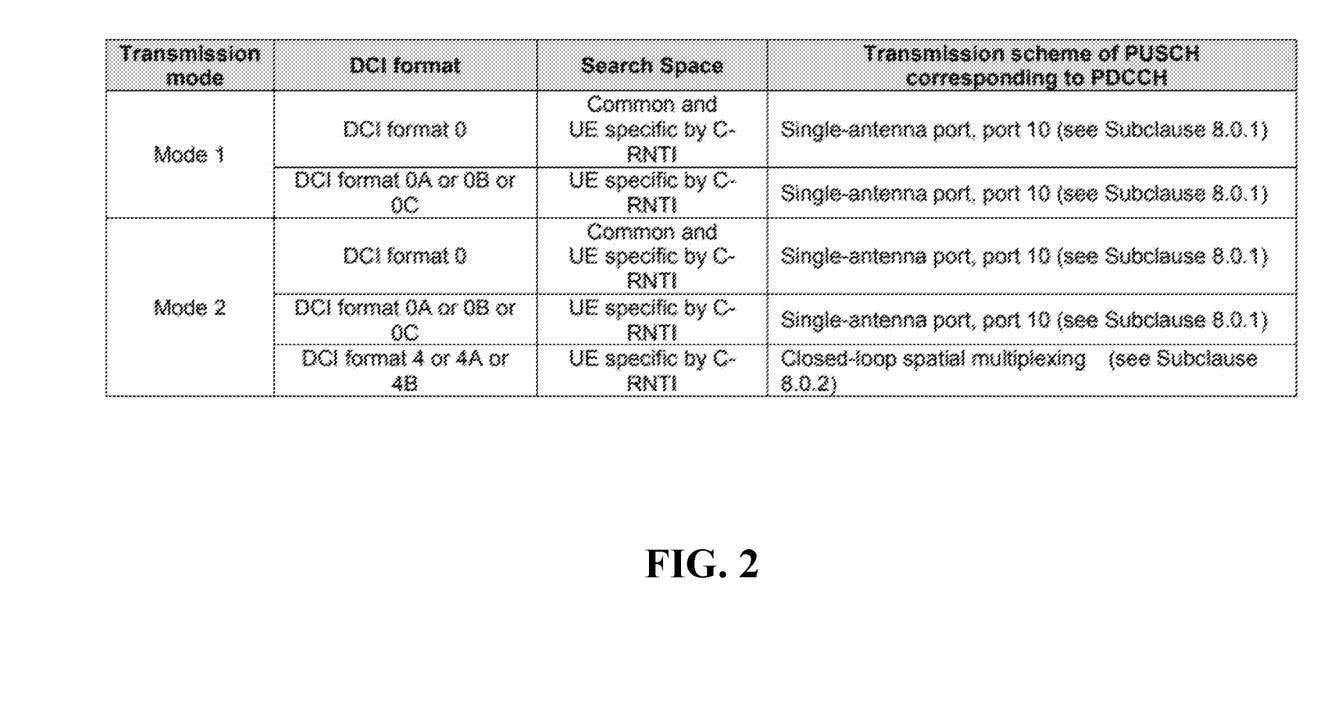
FIG. 2 shows exemplary uplink transmission modes that are defined in the current 3rd Generation Partnership Project (3GPP) standards.

In some embodiments, the base station first determines a transmission mode of a physical channel. For example, FIG. 2 shows exemplary uplink transmission modes that are defined in the current 3GPP standards. Additional transmission modes can be determined based on the uplink coverage level of the corresponding UEs. The base station then transmit a downlink control message based on the transmission mode to schedule a transmission of control information on the physical channel.

In some implementations, the downlink control message is scrambled by a 16-bit Radio Network Temporary Identifier (RNTI). In some implementations, a specific DCI format is used to transmit the control message. The control message can include at least one of the items listed in Table 1.

TABLE 1

Exemplary fields of the downlink control message

Carrier Indicator
Frequency-domain PUSCH resources
Time-domain PUSCH resources
Modulation and Coding Scheme (MCS)
New Data Indicator (NDI)
Redundancy Version (RV)
HARQ process number
CBG Transmission Information (CBGTI)
PUSCH power control
Sounding Reference Signal (SRS) resource indicator (SRI)
Transmitted Precoding Matrix Indicator (TPMI)
Transmission Rank Indicator (TRI)
Antenna port(s), scrambling identity, and number of layers
CSI measurement request
CSI report request
RLC feedback indicator
Sounding Reference Signal (SRS) triggering request In some embodiments, a simple modulation and coding scheme (MCS), such as low-density parity-check (LDPC) coding and QPSK modulation scheme, can be used for transmitting the uplink control information. For example, both RLC feedback and CSI feedback can be jointly encoded using LDPC and modulated using QPSK. In some embodiments, a CSI report request field is used to indicate for which carrier, carrier group, or carrier set CSI is requested. In some implementations, one wideband CSI can be reported for multiple carriers.

The control information to be transmitted on the physical uplink channel includes at least radio link control (RLC) feedback and/or CSI feedback. Multiple redundant versions of the RLC feedback and/or CSI feedback can be transmitted. The uplink control information is transmitted using resources in the frequency domain. The frequency-domain resources include a start position of physical resource block (PRB) and a number of PRBs. In some cases, the number of PRBs is a fixed number m, which can be predetermined or semi-statically configured by RRC signaling. The uplink control information is also transmitted using resources in the time domain. The time-domain resources include a start position of an OFDM symbol and a number of OFDM symbols. In some implementations, the start position and the number of OFDM symbols are the same in each slot.

In some embodiments, a transport block (TB) or a code block group (CBG) of the control information is transmitted by bundling multiple adjacent slots or mini-slots together. The number of adjacent slots or mini-slots bundled for the transmission can be determined using one of the following ways:

1. The number of slots or mini-slots has a one-to-one mapping with the level of enhanced coverage. The larger the coverage range, the larger the number of slots or mini-slots to be used for bundling.

2. The number of slots or mini-slots is predetermined.

3. The number of slots or mini-slots is semi-statically configured using radio resource control (RRC) signaling.

4. The number of slots or mini-slots is dynamically indicated using downlink control messages (e.g., DCI messages).

In some embodiments, all the slots or mini-slots share the same demodulation reference signals (DMRS) for modulation. The position and number of DRMS symbols correspond to the bundled slots. In some implementations, when the number of slots or mini-slots is semi-statically configured using RRC signaling, the position and number of DRMS are also configured using RRC signaling.

After sending a downlink control message to schedule transmissions of the uplink control information, the base station receives the uplink control information transmitted over a bundle of multiple adjacent slots or mini-slots. If the base station detects any error during demodulation of the received data, it may schedule a re-transmission of the control information in one of the following ways:

1. The base station can schedule a retransmission of the entire TB of the control information. The TB can be scheduled in the original subcarrier. In some embodiments, the TB can be scheduled in the supplemental UL subcarrier.

2. The base station can schedule a retransmission of a CBG of the control information. The UE only needs to retransmit the CBG that incurred demodulation errors. CBGs that have been demodulated correctly do not need to be retransmitted.

In some embodiments, a retransmission based on CBGs can be configured using higher layer signaling. In such cases, the downlink control message sent by the base station includes specific fields to indicate which CBG(s) needs to be retransmitted.

The retransmission of the control information can also be performed using a bundle of multiple adjacent slots or mini-slots. For example, when demodulation errors occur in only one CBG, redundant versions of the CBG can be transmitted using multiple adjacent slots or mini-slots. In another example, when modulation errors occur in two CBGs, redundant versions of the first CBG can be transmitted using the first k adjacent slots or mini-slots, and redundant versions of the second CBG can transmitted using the remaining adjacent slots or mini-slots. Each CBG can include an independent HARQ process number. Each CBG can also include a different redundant version of the control information.

Example Embodiment 2

Figure 3:
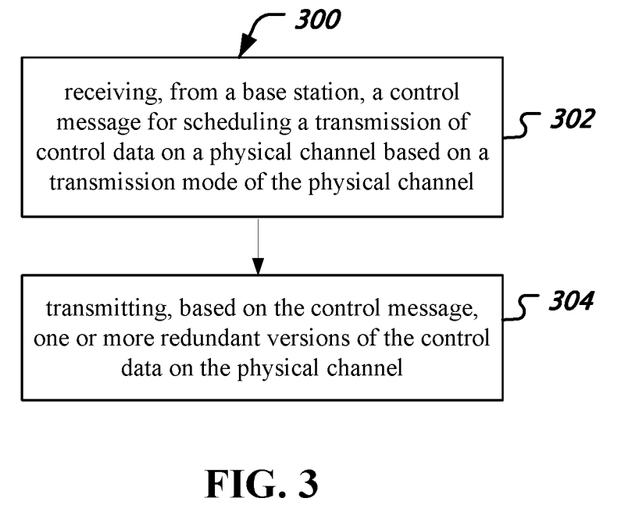
FIG. 3 shows a flowchart representation of a method 300 for wireless communication that can be implemented at a user equipment.

This embodiments describes exemplary operations that can be performed a user equipment (UE). FIG. 3 shows a flowchart representation of a method 300 for wireless communication that can be implemented at a user equipment. The method 300 includes, at 302, receiving, from a base station, a control message for scheduling a transmission of control information on a physical channel based on a transmission mode of the physical channel. The method 300 also includes, at 304, transmitting, based on the control message, one or more redundant versions of the control information on the physical channel.

The UE can perform blind detection using a specific RNTI to determine a transmission mode of the physical uplink channel. In some implementations, the UE determines whether it should schedule regular data transmission or control information transmission based on the format of the DCI message or a subset of bits in the DCI message. For example, if the DCI message it receives is in a first format (e.g., format X), then the UE will schedule uplink control information transmission accordingly. If the DCI message it receives is in a second format (e.g., format Y), then the UE will schedule regular uplink data transmission. In some cases, both data and control transmissions use the same DCI format, but the DCI message includes one or more bits to indicate whether the transmission should be data or control information.

In some embodiments, a transport block (TB) or a code block group (CBG) of the control information is transmitted using a bundle of multiple adjacent slots or mini-slots. Each slot can be used to transmit a different redundant version of the TB. Alternatively, each slot can be used to transmit a different CBG of the TB.

The multiple adjacent slots or mini-slots can be scheduled using the same parameters. In some implementations, however, each slot or mini-slot can have independent scheduling parameters. The scheduling parameters include at least the following: frequency domain resource allocations, time domain resource allocations, or the MCS. The scheduling parameters also include fields such as HARQ process number, CBGTI, or NDI.

The time domain resource allocation can indicate a start position of the time-domain symbols. For example, the start position can be indicated by an offset value as compared to the last symbol of the downlink control message.

After receiving the downlink control message from the base station, the UE then transmit the control information on the uplink channel.

In some embodiments, the UE jointly encodes a TB of the RLC and/or CSI feedback, and modulates the encoded data using the QPSK modulation scheme. The size of the TB can be ascertained using one or more of the following parameters: the number of layers for codeword mapping, the size of the allocated time-domain and frequency-domain resources, the number of mapped resource elements, the MCS level, or subcarrier spacing (SCS) related parameters. Particularly, when other parameters are the same, SCS has an inverse correspondence with the TBS. For example, a large SCS corresponds to a small TB size, and a small SCS corresponds to a large TB size.

In some embodiments, the allocated number of PRBs is equal to or smaller than a predetermined number (e.g., three PRBs). The allocated number of OFDM symbols is also equal to or smaller than a predetermined number (e.g., two OFDM symbols). Because the number of PRBs and OFDM symbols can be small, the final TB size is also relatively small.

The UE then repeatedly maps the modulated symbols to different time slots or mini-slots. When the base station schedules the transmission of the control information based on CBGs, the UE determines which CBGs to map to the bundle of slots or mini-slots based on CBGTI.

Example Embodiment 3

This embodiments describes details regarding the downlink control message for scheduling uplink control information transmission.

In some embodiments, the base station first determines a transmission mode based on the uplink coverage level of the UE. The base station then transmits a corresponding DCI message based on the transmission mode. In some implementations, the control message is further scrambled by a specific RNTI (e.g., a 16-bit RNTI).

Table 2 shows exemplary fields that can be included in the corresponding DCI message. For example, when the RLC feedback indicator is set to 1, the UE needs to jointly encode the RLC feedback with the CSI feedback.

TABLE 2

Exemplary fields of a DCI message

| Field name | Number of bits |
|---|---|
| Subcarrier indicator | 3 |
| RLC feedback indicator | 1 |
| Frequency-hopping indicator | 1 |
| Transmit Power Control (TPC) | 2 |
| Cyclic Redundancy Check (CRC) | 8 |
| CSI Report Request | 1 or 2 or 3 |
| Sounding Reference Signal (SRS) Request | 0 or 1 |
| CSI measurement request | 2 |
| New Data Indicator (NDI) | 1 |
| HARQ Process Number | 3 |
| Redundancy Version (RV) | 2 |

Figure 4:
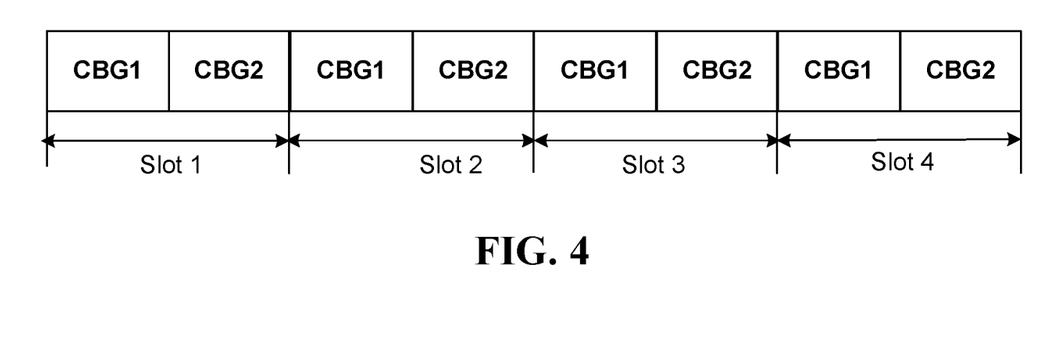
FIG. 4 shows an example of retransmission of a transport block (TB).

FIG. 4 shows an example of the process of retransmission of a transport block. In this particular example, the number of slots or mini-slots used for uplink control information transmission is four. In each of the slots, the frequency-domain resources have the same locations. For example, the uplink control information is mapped to PRB8~PRB10 in frequency domain from slot 5 to slot 8. The information is encoded using LDPC and modulated using the QPSK modulation scheme.

When multiple slots or mini-slots are used to transmit the same TB of the uplink control information, they can share the same HARQ process and transmit the same redundant version of the TB. If an error occurs when demodulating data from the slots, the base station can schedule a retransmission of the TB or one of the CBG of the TB. The downlink control message for scheduling the retransmission, therefore, needs to be adjusted to include an indicator (e.g., CBGTI) to indicate which CBG(s) of the TB need to be retransmitted. The retransmission can also share the same HARQ process, same redundant version, and the same NDI, etc., until all CBGs of the TB are demodulated correctly.

In this particular example, the TB has four CBGs. Errors occurred when the base station demodulates CBG1 and CBG2, while CBG3 and CBG4 are demodulated correctly. The base station, therefore, schedules retransmission of only CBG1 and CBG2 in a bundle of four adjacent slots.

Example Embodiment 4

Figure 5:
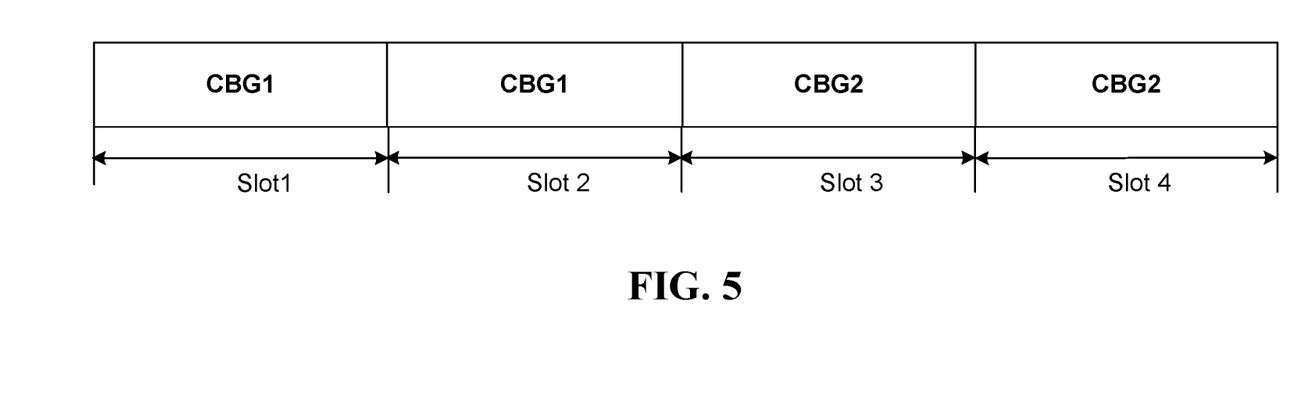
FIG. 5 shows another example of retransmission of a transport block.

FIG. 5 shows another example of the process of retransmission of a transport block. In this particular example, the bundled slots transmit different CBGs of a TB. Each CBG has an independent NDI, an independent HARQ process number, and an independent RV. For example, CBG1, which has a corresponding HARQ process number 1, is transmitted using slot1 and slot2. CBG2, which has a corresponding HARQ process number 2, is transmitted using slot3 and slot4.

When CBG1 is received correctly by the base station and errors occur during demodulation of CBG2, the base station can schedule the retransmission of CBG2 using the HARQ process corresponding to CBG2. In some implementations, the base station can schedule the retransmission of CBG2 using the HARQ process corresponding to CBG1. In some cases, the base station can use both HARQ processes that correspond to CBG1 and CBG2 to retransmit CBG2 to increase the probability of a successful retransmission.

Table 3 shows exemplary fields that can be included in the DCI message to indicate transmission of independent CBGs. Here, M is the number of CBGs configured in a TB, and N is the number of scheduled CBGs. The DCI message can include three parts. The first part includes common downlink control information for all slots or mini-slots, such as subcarrier indicator, frequency-domain resource and time-domain resource allocation information, MCS, power control information, etc. The second part includes downlink control information that is specific to each CBG, such as NDI, HARQ process number, or redundancy version. The third part includes other types of downlink control information, such as CSI measurement triggers.

TABLE 3

Exemplary fields of the DCI message

| Field name | Number of bits |
| --- | --- |
| Subcarrier indicator | 3 |
| RLC feedback indicator | 1 |
| Frequency-hopping indicator | 1 |
| Transmit Power Control (TPC) | 2 |
| Cyclic Redundancy Check | 8 |
| CSI Report Request | 1 or 2 or 3 |
| Sounding Reference Signal (SRS) Request | 0 or 1 |
| CSI measurement request | 2 |
| CBGTI | M |
| New Data Indicator (NDI) | N |
| HARQ Process Number | 4N |
| Redundant Version (RV) | 2N |

Example Embodiment 5

This embodiments shows exemplary ways of increasing HARQ-ACK coverage when HARQ-ACK information is piggybacked on PUSCH. The HARQ-ACK information includes both HARQ-ACK and HARQ-NACK.

Figure 6A:
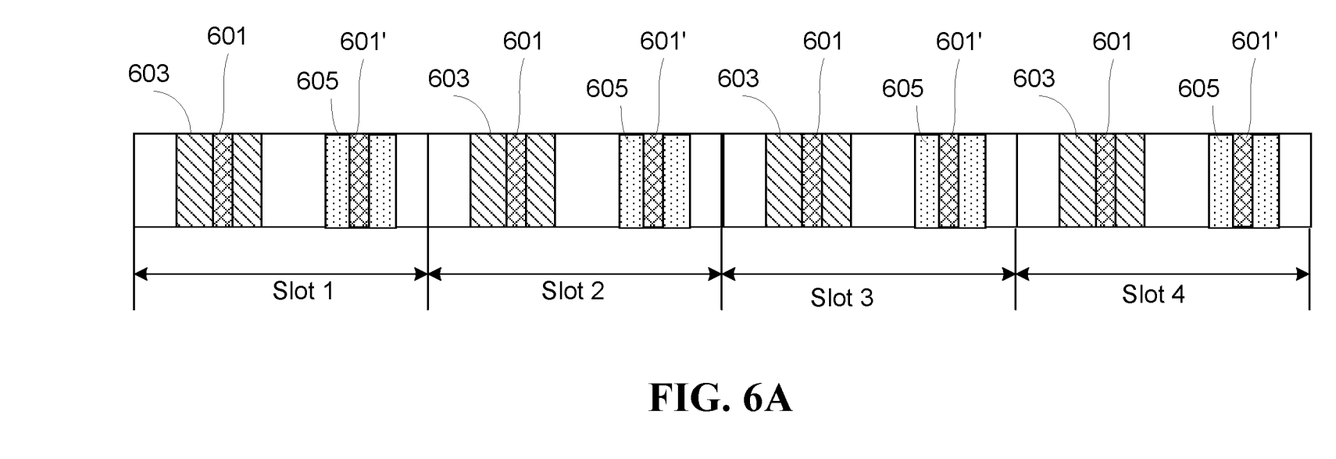
FIG. 6A shows an example of repetitive mapping of hybrid automatic repeat request acknowledgment (HARQ-ACK) information.

In time domain, HARQ-ACK information can be mapped repetitively to symbols adjacent to DMRS symbols. In some implementations, the repetitive mapping of HARQ-ACK information is done based on DMRS symbols. For example, as shown in FIG. 6A, each slot has two DMRS symbols: DMRS1 (601) and DMRS2 (601'). Two types of HARQ-ACK information are transmitted: HARQ-ACK1 (603) and HARQ-ACK2 (605). HARQ-ACK1 (603) is mapped repetitively to symbols adjacent to DMRS1 (601), and HARQ-ACK2 (605) is mapped repetitively to symbols adjacent to DMRS2 (601').

Figure 6B:
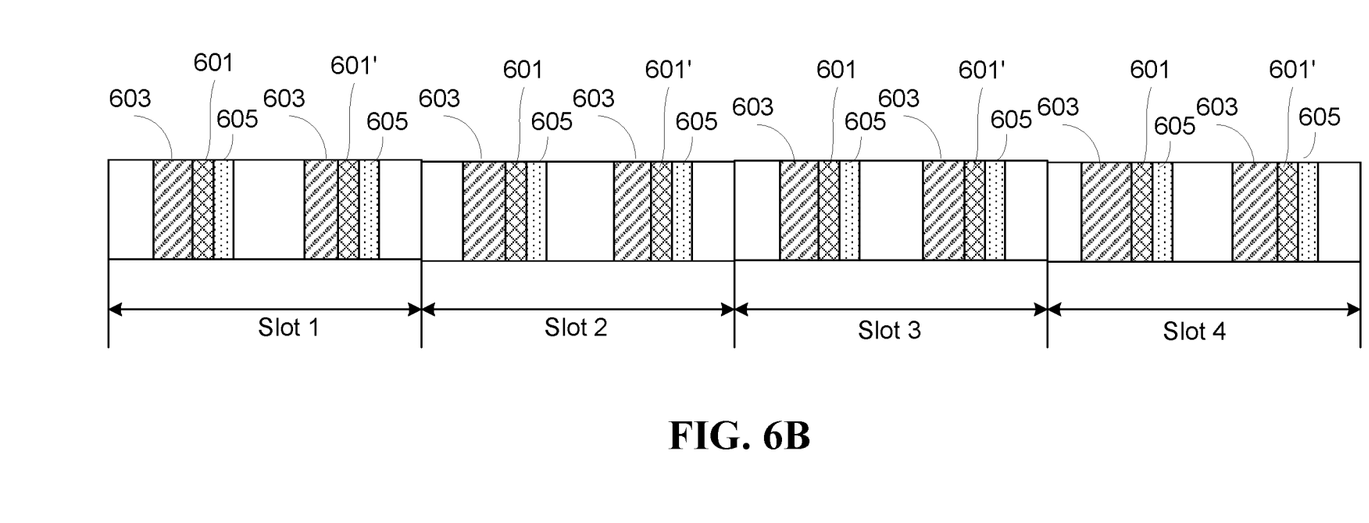
FIG. 6B shows another example of repetitive mapping of HARQ-ACK information.

In some implementations, the repetitive mapping of HARQ-ACK is done uniformly for different DMRS symbols. In another example, as shown in FIG. 6B, each slot has two DMRS symbols: DMRS1 (601) and DMRS2 (601'). Two types of HARQ-ACK information are transmitted: HARQ-ACK1 (603) and HARQ-ACK2 (605). HARQ-ACK1 (603) is mapped repetitively to symbols adjacent to one side of DMRS1 (601) and DMRS2 (601'), and HARQ-ACK2 (605) is mapped repetitively to symbols adjacent to the other side of DMRS1 (601) and DMRS2 (601').

Here, HARQ-ACK1 (603) is a HARQ-ACK codeword, and HARQ-ACK2 (605) is another HARQ-ACK codeword. The codeword size can be determined by the Downlink Assignment Index (DAI) field in the DCI message. Different HARQ-ACK information is encoded independently based on RM encoding, and modulated using BPSK or QPSK modulation scheme.

Figure 7:
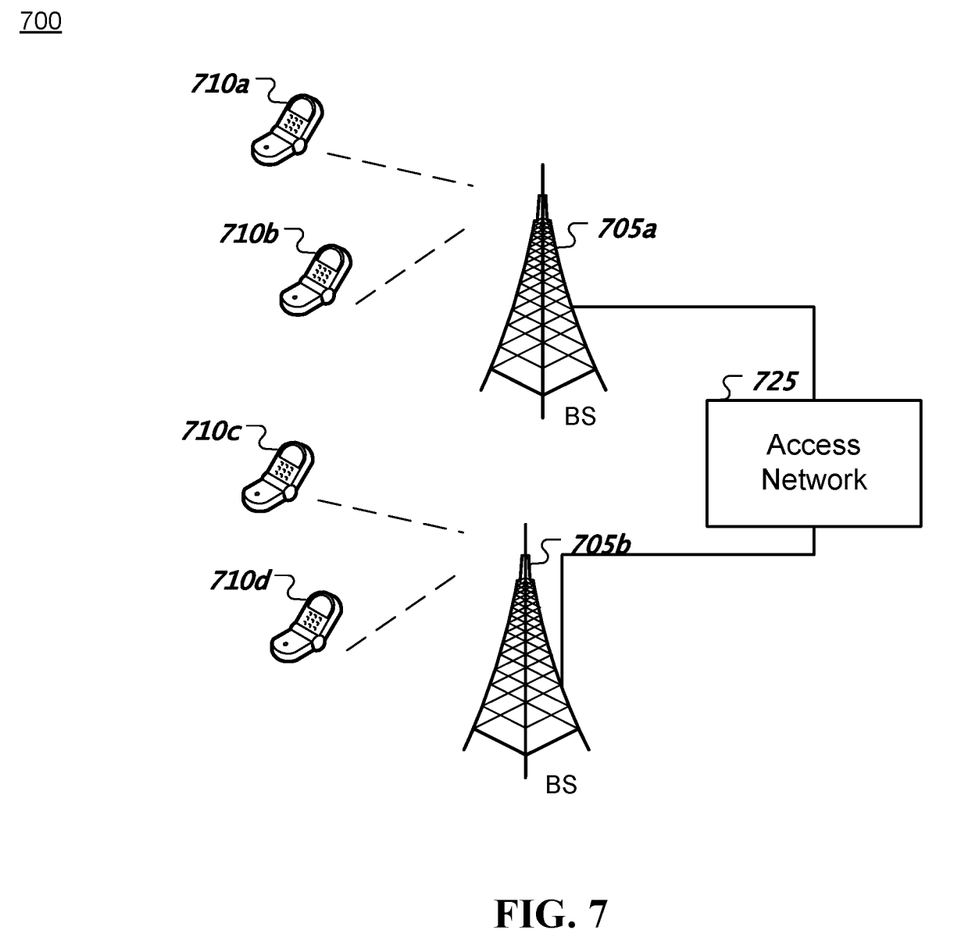
FIG. 7 shows an example of a wireless communication system where techniques in accordance with one or more embodiments of the present technology can be applied.

FIG. 7 shows an example of a wireless communication system where techniques in accordance with one or more embodiments of the present technology can be applied. A wireless communication system 700 can include one or more base stations (BSs) 705a, 705b, one or more wireless devices 710a, 710b, 710c, 710d, and an access network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The access network 725 can communicate with one or more base stations 705a, 705b. In some implementations, the access network 725 includes one or more base stations 705a, 705b. In some implementations, the access network 725 is in communication with a core network (not shown) that provides connectivity with other wireless communication systems and wired communication systems. The core network may include one or more service subscription databases to store information related to the subscribed wireless devices 710a, 710b, 710c and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The access network 725 can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 8:
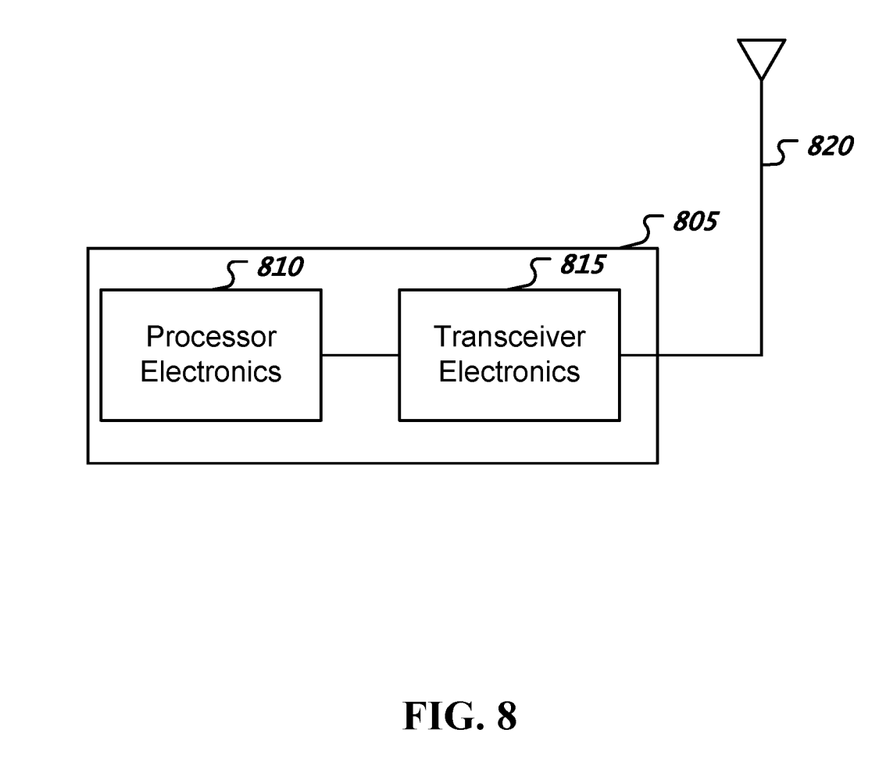
FIG. 8 is a block diagram representation of a portion of a radio station.

FIG. 8 is a block diagram representation of a portion of a radio station. A radio station 805 such as a base station or a wireless device (or UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805.

It is thus evident that this patent document describes coverage enhancing techniques that allow redundancy in uplink control information (e.g., CSI and/or HARQ-ACK information) to help increase the success rate of demodulating such information and enhance coverage of the uplink channel. Using the disclosed techniques, the transport block size of CSI can be made small to allow the use of a simple modulation and coding scheme (MCS), such as QPSK, for transmissions of such uplink control information. The disclosed techniques also allow transmission of the uplink control information based on both TBs and CBGs using either joint or independent HARQ process(es) to allow flexible scheduling of the transmissions.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
transmitting, to a user equipment, a control message based on a transmission mode of a physical channel, wherein the control message is configured to schedule a transmission of control information on the physical channel, the control information comprising at least channel state information, wherein the transmission of the control information comprises transmitting one or more redundant versions of the control information using a plurality of adjacent slots or mini-slots in time domain, and wherein the control information is transmitted in a form of a transport block, wherein a size of the transport block has an inverse correspondence to a subcarrier spacing of the physical channel, and wherein a first code block group of the transport block is transmitted using a first subset of the plurality of adjacent slots or mini-slots and a second code block group of the transport block is transmitted using a second subset of the plurality of adjacent slots or mini-slots.

2. The method of claim 1, wherein a first redundant version of the control information is transmitted using the first subset of the plurality of adjacent slots or mini-slots and a second redundant version of the control information is transmitted using the second subset of the plurality of adjacent slots or mini-slots.

3. The method of claim 1, where in the control information is transmitted in a form of one or more code block groups of a transport block, wherein the control message includes a field to indicate the one or more code block groups.

4. The method of claim 1, wherein the control message includes a field to indicate whether the control information further includes radio link control (RLC) feedback.

5. The method of claim 1, wherein the control information includes one or more redundant versions of hybrid automatic repeat request acknowledgment (HARQ-ACK) information mapped to adjacent symbols of a demodulation reference signal (DMRS) carried on the physical channel.

6. A method for wireless communication, comprising:
receiving, from a base station, a control message for scheduling a transmission of control information on a physical channel based on a transmission mode of the physical channel, the control information comprising at least channel state information; and
transmitting, based on the control message, one or more redundant versions of the control information on the physical channel using a plurality of adjacent slots or mini-slots in time domain, wherein the control information is transmitted in a form of a transport block, wherein a size of the transport block has an inverse correspondence to a subcarrier spacing of the physical channel, and wherein the transmitting comprises:
transmitting a first code block group of the transport block using a first subset of the plurality of adjacent slots or mini-slots, and
transmitting a second code block group of the transport block using a second subset of the plurality of adjacent slots or mini-slots.

7. The method of claim 6, wherein the transmitting comprises:
transmitting a first redundant version of the control information using the first subset of the plurality of adjacent slots or mini-slots, and
transmitting a second redundant version of the control information using the second subset of the plurality of adjacent slots or mini-slots.

8. The method of claim 6, wherein the control information is transmitted in a form of one or more code block groups of a transport block, and wherein the control message includes a field to indicate the one or more code block groups.

9. The method of claim 6, wherein the control message includes a field to indicate whether the control information further includes radio link control (RLC) feedback.

10. The method of claim 6, wherein the control information includes one or more redundant versions of hybrid automatic repeat request acknowledgment (HARQ-ACK) information mapped to adjacent symbols of a demodulation reference signal (DMRS) carried on the physical channel.

11. An apparatus for wireless communication, comprising:
a processor; and
a memory including processor-executable instructions stored thereon, the processor-executable instructions upon execution by the processor configures the processor to:
transmit, to a user equipment, a control message based on a transmission mode of a physical channel,
wherein the control message is configured to schedule a transmission of control information on the physical channel, the control information comprising at least channel state information,
wherein the transmission of the control information comprises transmitting one or more redundant versions of the control information using a plurality of adjacent slots or mini-slots in time domain and
wherein the control information is transmitted in a form of a transport block, wherein a size of the transport block has an inverse correspondence to a subcarrier spacing of the physical channel, and wherein a first code block group of the transport block is transmitted using a first subset of the plurality of adjacent slots or mini-slots and a second code block group of the transport block is transmitted using a second subset of the plurality of adjacent slots or mini-slots.

12. The apparatus of claim 11, wherein a first redundant version of the control information is transmitted using the first subset of the plurality of adjacent slots or mini-slots and a second redundant version of the control information is transmitted using the second subset of the plurality of adjacent slots or mini-slots.

13. The apparatus of claim 11, where in the control information is transmitted in a form of one or more code block groups of a transport block, wherein the control message includes a field to indicate the one or more code block groups.

14. The apparatus of claim 11, wherein the control message includes a field to indicate whether the control information further includes radio link control (RLC) feedback.

15. The apparatus of claim 11, wherein the control information includes one or more redundant versions of hybrid automatic repeat request acknowledgment (HARQ-ACK) information mapped to adjacent symbols of a demodulation reference signal (DMRS) carried on the physical channel.

16. An apparatus for wireless communication, comprising:
a processor; and
a memory including processor-executable instructions stored thereon, the processor-executable instructions upon execution by the processor configures the processor to:
receive, from a base station, a control message for scheduling a transmission of control information on a physical channel based on a transmission mode of the physical channel, the control information comprising at least channel state information; and transmit, based on the control message, one or more redundant versions of the control information on the physical channel using a plurality of adjacent slots or mini-slots in time domain, wherein the control information is transmitted in a form of a transport block, wherein a size of the transport block has an inverse correspondence to a subcarrier spacing of the physical channel, and wherein the one or more redundant versions of the control information is transmitted by:

transmitting a first code block group of the transport block using a first subset of the plurality of adjacent slots or mini-slots, and transmitting a second code block group of the transport block using a second subset of the plurality of adjacent slots or mini-slots.

17. The apparatus of claim 16, wherein the processor is configured to:

transmit a first redundant version of the control information using the first subset of the plurality of adjacent slots or mini-slots, and transmit a second redundant version of the control information using the second subset of the plurality of adjacent slots or mini-slots.

18. The apparatus of claim 16, wherein the control information is transmitted in a form of one or more code block groups of a transport block, and wherein the control message includes a field to indicate the one or more code block groups.

19. The apparatus of claim 16, wherein the control message includes a field to indicate whether the control information further includes radio link control (RLC) feedback.

20. The apparatus of claim 16, wherein the control information includes one or more redundant versions of hybrid automatic repeat request acknowledgment (HARQ-ACK) information mapped to adjacent symbols of a demodulation reference signal (DMRS) carried on the physical channel.

* * * * *